(12) United States Patent
Takeda

(10) Patent No.: US 7,245,417 B2
(45) Date of Patent: Jul. 17, 2007

(54) PROCESS FOR PRODUCING DISPLAY DEVICE

(75) Inventor: Toshihiko Takeda, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/114,163

(22) Filed: Apr. 26, 2005

(65) Prior Publication Data

US 2005/0195470 A1    Sep. 8, 2005

Related U.S. Application Data

(63) Continuation-in-part of application No. 10/691,154, filed on Oct. 21, 2003, now Pat. No. 6,894,825.

(30) Foreign Application Priority Data

Oct. 21, 2002  (JP) .............................. 2002-305681
Oct. 21, 2002  (JP) .............................. 2002-305682

(51) Int. Cl.
    *G02B 26/00*  (2006.01)
(52) U.S. Cl. ........................... 359/296; 430/32; 430/38
(58) Field of Classification Search ................ 359/296; 430/32, 34, 38; 204/600, 450; 345/105, 345/107

See application file for complete search history.

(56) References Cited

U.S. PATENT DOCUMENTS 5,522,124 A    6/1996  Depperman

| 5,943,113 A | 8/1999 | Ichihashi |
|---|---|---|
| 5,986,729 A | 11/1999 | Yamanaka et al. |
| 6,563,557 B2 | 5/2003 | Yamanaka et al. |
| 6,930,818 B1 * | 8/2005 | Liang et al. ................. 359/296 |
| 2002/0008898 A1 | 1/2002 | Katase |
| 2002/0018043 A1 | 2/2002 | Nakanishi |

FOREIGN PATENT DOCUMENTS

| CN | 1239232 | 12/1999 |
|---|---|---|
| JP | 2001343672 | 12/2001 |
| WO | WO 02/01281 A2 | 1/2002 |

OTHER PUBLICATIONS

Korean Official Letter/Search Report mailed Aug. 31, 2006.

* cited by examiner

*Primary Examiner*—Ricky Mack
*Assistant Examiner*—Tuyen Tra
(74) *Attorney, Agent, or Firm*—Morgan & Finnegan, L.L.P.

(57) ABSTRACT

An electric display device of the type wherein a liquid is disposed in a space defined by a substrate, a spacer disposed on the substrate, and a sealing film disposed on an upper end portion of the spacer is produced through a process including a step of disposing a sealing film precursor, comprising a polymerizable compound, supported by a supporting member on both an exposed surface of the liquid and the upper end portion and at least a part of the side portion of the spacer in a state that the liquid is filled between adjacent spacers, and a step of polymerizing the polymerizable compound to form the sealing film.

5 Claims, 12 Drawing Sheets

PROCESS FOR PRODUCING DISPLAY DEVICE

This is a Continuation-In-Part Application of application Ser. No. 10/691,154, filed Oct. 21, 2003 now U.S. Pat. No. 6,894,825.

FIELD OF THE INVENTION AND RELATED ART

The present invention relates to a process for producing an electric display device which reflects a distribution state of a group of electrophoretic particles in a display state. The present invention also relates to a process for producing an electric display device which contains a fluid.

When charged electrophoretic particles are supplied with an electric field in an insulating liquid, the electrophoretic particles undergo displacement under the action of electrophoresis. In recent years, an electrophoretic display (EPD) utilizing this electrophoresis phenomenon has been extensively developed. Compared with a liquid crystal display device, the EPD has advantageous features, such as a high display contrast, no viewing angle dependence, a display state memory characteristic, a flexible device structure, and no need of a backlight or a polarizer.

As described above, the electrophoretic particles are dispersed in the liquid, so that the electrophoretic particles are readily displaced in a substrate surface direction by diffusion etc. This displacement induces a deterioration in display image, so that it is necessary to restrict a movable area of the fine particles (electrophoretic particles). One of methods of restricting the movable area of the fine particles is that a plurality of minute hollow spaces are formed on a substrate for device and the electrophoretic particles and the insulating liquid are confined. If this confinement is completely performed, it is possible to restrict he particle displacement area to the minute hollow spaces in which the electrophoretic particles are confined.

Such a process wherein a state of confinement of electrophoretic particles, insulating liquid, etc., is created in hollow spaces has been proposed in Japanese Laid-Open Patent Application No. 2000-342672 (e.g., FIG. 26). According to the particle confinement method of this JP publication (before examination), at first, a spacer is formed on a substrate so as to define a plurality of cells. In each of the defined cells, a mixture (dispersion system) comprising electrophoretic particles are liquid is filled by an ink jet method. On the dispersion system, a sealing material is applied and cured to crate a state wherein the dispersion system is confined. Thereafter the cured sealing material disposed on the substrate provided with the spacer and an opposite substrate are bonded to each other to complete a display device.

Further, the JP publication also discloses a process wherein a mixture of the dispersion system and the sealing material is filled in the respective cells by the ink jet method. In this case, if the sealing material has a specific gravity smaller than that of the dispersion system and they are not soluble in each other the sealing material and the dispersion system are (phase-)separated from each other. As a result, a state in which the sealing material is disposed on the dispersion system is finally created. In such a state, the sealing material is cured to form a state that the dispersion system is confined. Thereafter, the cured sealing material disposed on the spacer-formed substrate and an opposite substrate are bonded to each other to complete a display device.

However, the production process of the JP publication (JP2000-343672) has been accompanied with a possibility that the following problems are caused to arise.

First, there is a problem such that it is difficult to use ultraviolet (UV) polymerizable materials represented by (meth-)acrylate type monomers. These materials are usable as a starting material for a soft sealing film required to make a resultant display device flexible. Further, these materials are inexpensive, thus reducing costs of the display device. The above UV polymerizable materials are ordinarily polymerized through radical polymerization which is inhibited by oxygen. Accordingly, in the case where the polymerization of the sealing material is performed in a state in which the sealing material is exposed to ambient air as in the JP publication, it is difficult to use the UV polymerizable materials. If the materials are used, a particular curing apparatus for removing oxygen from a polymerization environment is required.

Secondly, there is a problem such that the sealing material is limited in specific gravity, thus narrowing the scope of selection of materials for the sealing film. In the JP publication, the specific gravity of the sealing material is required to be smaller than that of the dispersion system. For example, if a solvent of isoparaffin type which is frequently used as a dispersion medium, the specific gravity of the sealing material is required to be less than 1. However, most of curable materials have specific gravities larger than 1. For this reason, the scope of selection of the materials becomes small.

Thirdly, there is a problem such that it is difficult to dispose the sealing material uniformly over a wide area. This is attributable to an occurrence of ununiformity of the sealing material layer which is exposed to ambient air. One of the reasons for causing the ununiformity is a droplet (formation) phenomenon of the sealing material. It is generally difficult to obviate the occurrence of ununiformity. Further, the occurrence of ununiformity becomes more noticeable in a larger-sized device.

On the other hand, the liquid crystal display device has a structure similar to that of the electrophoretic display device described above. More specifically, two substrates are disposed opposite to each other while sandwiching a structure as a spacer for keeping a gap therebetween. In the gap, a liquid crystal is filled. Depending on the uses, in some cases, the liquid crystal display device is mounted on a curved surface or carried in a rolled state, thus employing a flexible substrate. As a production process of such a liquid crystal display device, there has been proposed a process in which a liquid crystal material in a flowable state is sandwiched between two films and passed through between rotating roller.

In the following description, a partition wall of the electrophoretic display device is also called the "spacer" in some cases.

In the liquid crystal display device, a gap between upper and lower substrates is an important factor for determining an optical property. Even when the device is bent as a flexible display device, the substrate gap is required to be kept at a predetermined value. More specifically, the two substrate films are required to securely adhere to the structure as the spacer so as not to change the gap between the substrates when the device is bent. In this respect, the liquid crystal display device has common problems to the spacer (partition wall) of the electrophoretic display device described above.

As described above, the spacer is disposed for the purpose of keeping the gap between the substrates at a constant value, thus not preventing the liquid crystal from moving toward an adjacent pixel. Accordingly, the spacer may be one which does not completely partition adjacent pixels different from the case of the electrophoretic display device.

Further, in the case of the liquid crystal display device, an alignment state of liquid crystal molecules are determined by the surfaces of the upper and lower substrates in contact with the liquid crystal material, so that the surfaces are required to have desired physicochemical properties. The physicochemical properties for aligning liquid crystal molecule at the substrate surface includes surface energy, alignment order of surface molecule, surface unevenness, etc.

SUMMARY OF THE INVENTION

An object of the present invention is to provide a process for producing an electric display device having solved the above-mentioned problems.

A specific object of the present invention is to provide a process for producing an electric display device capable of forming inexpensive and soft sealing film without being restricted in specific gravity of a polymerizable compound by using a UV polymerizable compound polymerized through radial polymerization as a starting material for the sealing film.

According to a first aspect of the present invention, there is provided a process for producing an electric display device of the type wherein a dispersion liquid comprising at least a dispersion medium and electrophoretic particles is disposed in a space defined by a substrate, a spacer disposed on the substrate, and a sealing film disposed on an upper end portion of the spacer, the process comprising:

a step of disposing a sealing film precursor, comprising a polymerizable compound, supported by a supporting member on both an exposed surface of the dispersion liquid and at least a part of the upper end portion of the spacer in a state that the dispersion liquid is filled between adjacent spacers, and a step of polymerizing the polymerizable compound to form the sealing film.

According to a second aspect of the present invention is to provide a process for producing an electric display device of the type wherein a dispersion liquid comprising at least a dispersion medium and electrophoretic particles is disposed in a space defined by a substrate, a spacer disposed on the substrate, and provided with a bonding film at an upper end portion thereof and a sealing film disposed on the upper end portion of the spacer, the process comprising:

a step of disposing a bonding film precursor, comprising a polymerizable compound, on the upper end portion of the spacer, a step of disposing a sealing film precursor, comprising a polymerizable compound, on both an exposed surface of the dispersion liquid and at least the surface of the bonding film at the upper end portion of the spacer, and a step of polymerizing the polymerizable compound in a state that the bonding film precursor contacts the sealing film precursor to integrally form the sealing film and the bonding film.

By using the production processes according to the present invention, it is possible to provide an electric display device having inexpensive and flexible sealing film irrespective of the specific gravity of the polymerizable compound. Further, it is also possible to ensure a good adhesive properties between the sealing film and the spacer.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
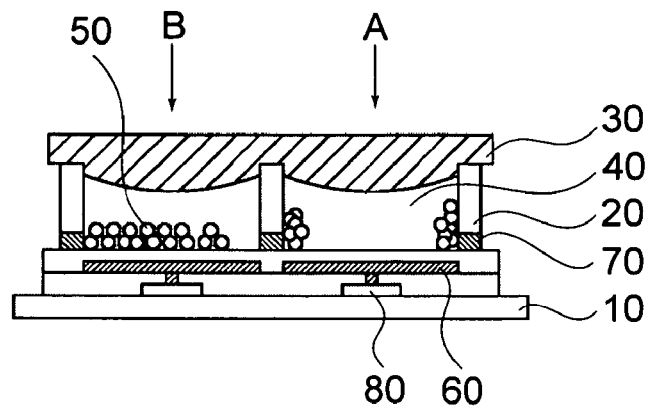
FIG. 1 is a schematic sectional view illustrating an embodiment of an electric display device produced by the process of the present invention.

Hereinbelow, the production process of electric display device according to the present invention will be described more specifically.

The production process according to the first aspect of the present invention may include:

a process for producing an electric display device of the type wherein a dispersion liquid comprising at least a dispersion medium and electrophoretic particles is disposed in a space defined by a substrate, a spacer disposed on the substrate, and a sealing film disposed on an upper end portion of the spacer wherein the sealing film is formed through polymerization of a polymerizable compound in such state that the dispersion liquid is filled between adjacent spacers, that a sealing film precursor, comprising the polymerizable compound, contacts both an exposed surface of the dispersion liquid and at least a part of the upper end portion of the spacer, and that the sealing film precursor is supported by a planar supporting member.

As described above, in the present invention, the sealing film precursor is disposed so as to contact both the dispersion liquid and an upper surface of the partition wall, so that the polymerized sealing film not only functions as an adhesive to the partition wall upper surface but also directly contact the dispersion liquid to affect a characteristic of the dispersion liquid.

The sealing method in the present invention is always applicable to the case of sealing a liquid or a flowable substance, thus being applicable to not only the electrophoretic display device but also the liquid crystal display device. However, in either case, the resultant display device is required to control an interface between the sealing film and the liquid or flowable substance to be sealed depending on a device characteristic.

In the electrophoretic display device, when electrophoretic particles are deposited on the surface of the sealing film and are adsorbed by the sealing film surface as they are, a resultant bright/dark contrast is lowered. Accordingly, in order to prevent the deposition of the electrophoretic particles on the sealing film surface, the sealing film may preferably have a low surface energy.

Similarly, in the liquid crystal display device, the surface energy is an important parameter which affects the alignment state of liquid. With respect to a liquid crystal display device of such a homeotropic (vertical) alignment type having a wide viewing angle in, e.g., a vertical alignment (VA) mode or a patterned vertical alignment (PVA) mode, the liquid crystal molecules are advantageously liable to be placed in a homeotropic (vertical) alignment state when a surface energy is lower at upper and lower interfaces (surfaces of the substrate and the sealing film in this case) as an alignment film.

In the present invention, attention is given to this point and thus the sealing film has a certain function with respect to an objective liquid at the surface thereof directly contacting the dispersion liquid or the liquid crystal. More specifically, in the present invention, a sealing film having a surface energy smaller than a surface energy of the electrophoretic dispersion liquid or the liquid crystal used, so that the sealing film has a dispersion state retaining function for stably holding the electrophoretic particles in the dispersion liquid without depositing the particles thereon or a function of homeotropically (vertically) aligning liquid crystal molecules.

Another function required for the sealing film is a wettability to the partition wall of the electrophoretic display device or the spacer of the liquid crystal display device.

As described in detail later, in the present invention, the sealing film is a liquid in a precursor monomer state before polymerization and is first applied onto a flat supporting member. In this state, the sealing film precursor (monomer) contacts the spacer (partition wall) and the dispersion liquid (or the liquid crystal) disposed on an opposite substrate, and at the same time, is pressed against an upper surface of the spacer. The sealing film precursor may desirably be extended to a side surface of the spacer while removing the dispersion liquid (or the liquid crystal). For this purpose, the sealing film precursor is required to have a smaller surface energy than the dispersion liquid (or the liquid crystal). In the present invention, as described above, in the polymerized state, the sealing film having the smaller surface energy is used but the sealing film precursor has the substantially same surface energy as the (polymerized) sealing film, thus satisfying the surface energy requirement.

The production process according to the first aspect of the present invention may include the following specific embodiments (a) to (l):
(a) the supporting member has a surface which has an affinity to the sealing film precursor,
(b) the dispersion liquid and the sealing film precursor are insoluble in each other,
(c) the polymerizable compound is a photopolymerizable compound;
(d) the photopolymerizable compound comprises a photopolymerizable monomer or oligomer;
(e) the photopolymerizable monomer is 1,4-butanediol-diglycidyl ether diacrylate;
(f) the photopolymerizable oligomer is polytetramethylene ether glycol=di(2-maleimide acetate),
(g) the photopolymerizable monomer is fluorine-containing acrylate,
(h) the photopolymerizable monomer or oligomer comprises at least two species of monomers or oligomers, at least one of which is a fluorine-containing acrylate,
(i) the photopolymerizable monomer or oligomer comprises at least two species of monomers or oligomers at least one of which is polytetramethylene ether glycol=di(2-maleimide acetate),
(j) the supporting member is removed from the sealing film after completion of the polymerization,
(k) on the sealing film, another film is disposed after the supporting member is removed,
(l) the supporting member and the sealing film are transparent, and
(m) a surface energy of the sealing film is smaller than the surface energy of the dispersion liquid or the liquid crystal.

The production process according to the second aspect of the present invention may includes a process for producing an electric display device of the type wherein a dispersion liquid comprising at least a dispersion medium and electrophoretic particles is disposed in a space defined by a substrate, a spacer disposed on the substrate, and provided with a bonding film at an upper end portion thereof and a sealing film disposed on the upper end portion of the spacer; wherein the sealing film is formed through polymerization of a sealing film precursor comprising a polymerizable compound and a bonding film precursor, comprising a polymerizable compound; a layer of the bonding film precursor is disposed on at least the upper end portion of the spacer; and the polymerization is performed in a state that a layer of the sealing film precursor contacts on both an exposed surface of the dispersion liquid, filled between adjacent spacers, and at least the layer of the being film precursor.

The production process according to the second aspect of the present invention may include the following specific embodiments (a) to (t):
(a) the polymerizable compound has at least one group selected from the group consisting of —O—, —CH$_2$—O—, —OH, and —CF$_2$—;
(b) the polymerizable compound has a polyethylene glycol structure,
(c) the polymerizable compound is a photopolymerizable compound,
(d) the photopolymerizable monomer is 1,4-butanediol-diglycidyl ether diacrylate,
(e) the spacer comprises a polymer of the polymerizable compound,
(f) the photopolymerizable monomer is fluorine-containing acrylate,
(g) the photopolymerizable monomer or oligomer comprises at least two species of monomers or oligomers, at least one of which is a fluorine-containing acrylate,
(h) the photopolymerizable monomer or oligomer comprises at least two species of monomers or oligomers at least one of which is polytetramethylene ether glycol=di(2-maleimide acetate),
(i) the dispersion liquid and the sealing film precursor are insoluble in each other,
(j) the layer of bonding film precursor is disposed at least on the upper end portion of the spacer before the polymerization,
(k) the disposition of the layer of bonding film precursor is performed by transfer of the polymerizable compound from a substrate, to which the polymerizable compound is applied, onto the upper end portion of the spacer,
(k) the layer of bonding film precursor is disposed on the spacer by coating the polymerizable compound on the surface of the substrate on which the spacer is formed,
(m) the spacer comprises a polymer of the polymerizable compound,
(n) the polymerization is performed in a state that the layer of bonding film precursor is supported by a planer supporting member,
(o) the supporting member is removed after the polymerization,
(p) the layer of sealing film precursor is formed by spraying a volatile liquid containing the polymerizable compound dissolved therein onto the exposed surface of the dispersion liquid and the layer of bonding film precursor and volatilizing the volatile liquid,
(q) the layer of sealing film precursor is formed by applying the sealing film precursor onto the exposed surface of the dispersion liquid and the layer of bonding film precursor,
(r) the layer of sealing film precursor includes two layers,
(s) one of the two layers constituting the sealing film precursor layer is formed by application of the polymerizable compound,
(t) a layer contacting the dispersion liquid exposed surface o the two layers constituting the sealing film precursor layer comprises a polymer of the polymerizable compound used in (s), and
(u) a surface energy of the sealing film is smaller than the surface energy of the dispersion liquid or the liquid crystal.
(1) Hereinbelow, an embodiment of the production process according to the first aspect of the present invention will be described specifically with reference to the drawings.

FIG. 1 is a schematic sectional view of a display device produced through a first embodiment of the production process according to the first aspect of the present invention.

Referring to FIG. 1, the display device includes a substrate 10, spacers 20 disposed so as to surround and define pixels, a sealing film 30, a dispersion medium 40, electrophoretic compounds 50, a first electrode 70 disposed at each pixel, a second electrode disposed at each pixel, and a switching device 80, such as TFT (thin film transistor), disposed with respect to each pixel. From FIG. 1, other structural members for the display device, such as an electric signal application means for applying an electric signal between the electrodes are omitted.

The display device produced through the production process of the present invention reflects a distribution state of the electrophoretic particles 50 in a display state.

More specifically, in an area indicated by A, a distribution state wherein the electrophoretic particles 50 gather on the spacer 20 side is shown. When the area A is observed from the sealing film 30 side of the display device, the area A looks white if the surface of the first electrode 60 is white.

On the other hand, in an area indicated by B, a distribution state wherein the electrophoretic particles 50 are dispersed in the substrate surface direction is shown. When the area B is observed from the sealing film 30 side, the area B looks like the color (black in this embodiment) of the electrophoretic particles 50.

In order to change the display state, the electrophoretic particles 50 are displaced on the substrate to be changed in distribution state. For example, it is possible to electrophoretically move and displace the electrophoretic particles 50 by applying an electric signal between the first and second electrodes. In the present invention, a method of displacing the electrophoretic particles on the substrate required at the time of changing the display state is not particularly limited. For example, the electrophoretic particles may undergo displacement on the substrate by utilizing dielectric migration force or electrically hydrodynamic flow of the dispersion medium.

In the above description, the color of the electrophoretic particles is black and that of the first electrode surface is white but are not limitative. For example, it is also possible to effect color display by appropriately changing the color of the first electrode surface to red, green, blue, etc.

In FIG. 1, the electrode system (structure) is disposed on the substrate 10 side. The electric field created by the electrode system largely displaces the electrophoretic particles in the planar direction of the sealing film. In the present invention, however, it is also possible to adopt an electrode structure for largely displacing the electrophoretic particles in the vertical direction of the sealing film as long as a desired display state is created.

Figure 7:
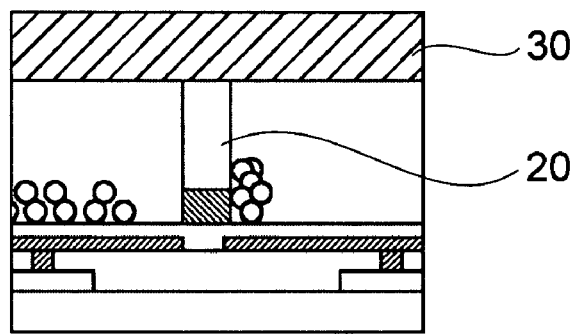
Figure 9:
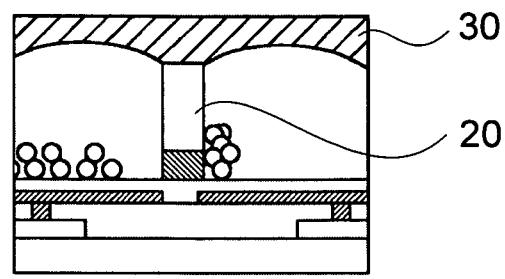

The sealing film 30 shown in FIG. 1 has such a sectional configuration (shape) that it is curved toward the substrate side but may also have a planar configuration or such a configuration that it is curved toward a direction opposite to the substrate, as shown in FIGS. 7 and 9, respectively.

Figure 2:
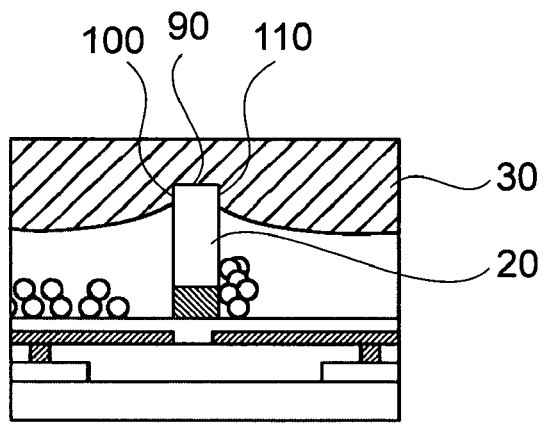
FIG. 2 is an enlarged sectional view of the display device of FIG. 1.
Figure 6:
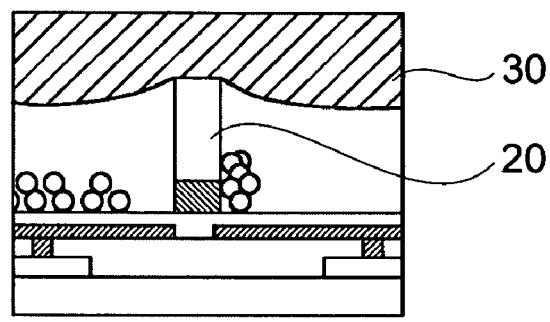
FIGS. 6, 7, 8 and 9 are enlarged sectional views of the display device showing a portion in the neighborhood of a spacer 20.
Figure 8:
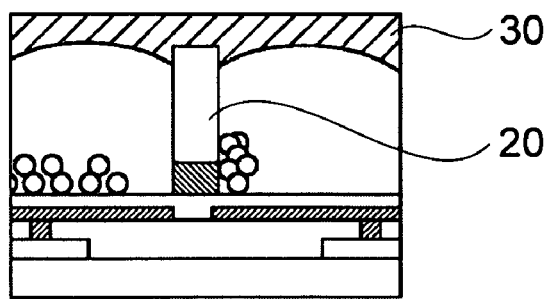

The sealing film is sufficient if it is adhered to at least a part of the upper end portion of the spacer but may preferably be adhered to the entire surface of the upper end portion of the spacer as shown in, e.g., FIGS. 6, 7 and 9, more preferably be adhered to not only the entire surface of the upper end portion of the spacer as shown in, e.g., FIGS. 2 and 8. This is because as an adhered area of the sealing film to the spacer becomes larger, adhesive properties between the sealing film and the spacer also become larger. FIG. 2 schematically shows such a state that the sealing film which is curved toward the substrate 10 side adheres to the upper end portion 90 and a part of side portions 100 and 110 of the spacer 20.

According to an experiment, a shape of an interface between the sealing film 30 and the dispersion liquid 40 may be those shown in FIGS. 2 and 8. The shape varies depending on not only a difference in surface energy between the sealing film and the dispersion liquid but also an amount of the sealing film precursor and a pressure at the time of pressing the above described supporting member against the substrate.

However, as described above, the extension of the contact surface of the sealing film precursor at the spacer surface is determined by a surface tension. More specifically, in order to extend the contact surface of the sealing film precursor at the upper and side surfaces of the spacer while removing the dispersion liquid (or the liquid crystal), a wettability of the sealing film precursor to the spacer surface is required to be better than that of the dispersion liquid (or the liquid crystal) to the spacer surface. For this reason, in the present invention, a material for the sealing film precursor is selected so that the surface energy of the sealing film precursor is smaller than that of the dispersion liquid (or the liquid crystal).

Next, an embodiment of the production process of the display device shown in FIG. 1 will be explained with reference to process drawings of FIGS. 3–5.

<Step 1>

Figure 3:
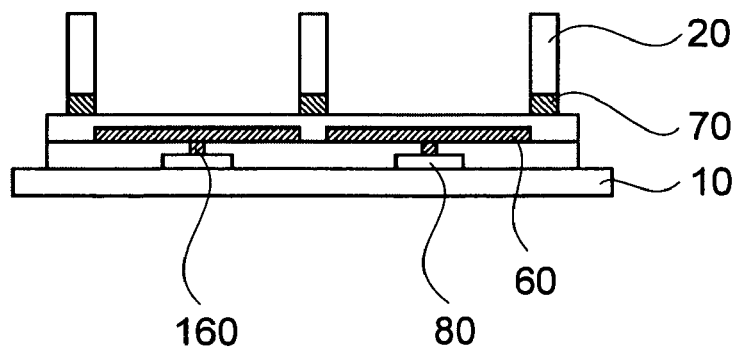
FIGS. 3, 4 and 5 are schematic views for illustrating the process for producing the display device according to the present invention.

FIG. 3 schematically illustrates Step 1 which is a step until formation of the spacer 20.

First, on he substrate 10, switching devices 80 are formed and then covered with an insulating layer. In the insulating layer, contact holes 160 are provided. Thereafter, on the insulating layer, a resist pattern for scattering incident light is formed, and thereon, a first electrode 60 (of, e.g., aluminum exhibiting a high light reflectance) is formed so as to be connected with the switching device 80 through the contact hole 160. If the first electrode 60 has the highlight reflectance, it also functions as a light reflecting/scattering layer.

The first electrode 60 is covered with an insulating light scattering layer. On the light scattering layer, a second electrode 70 and a spacer 20 are formed. The spacer may be formed through any method as long as a desired spacer can be formed. For example, the spacer can be formed through a known photolithographic process.

After the spacer is formed, it is possible to cover the surfaces of the insulating light scattering layer, disposed on the first electrode, and the second electrode.

<Step 2>

Figure 4:
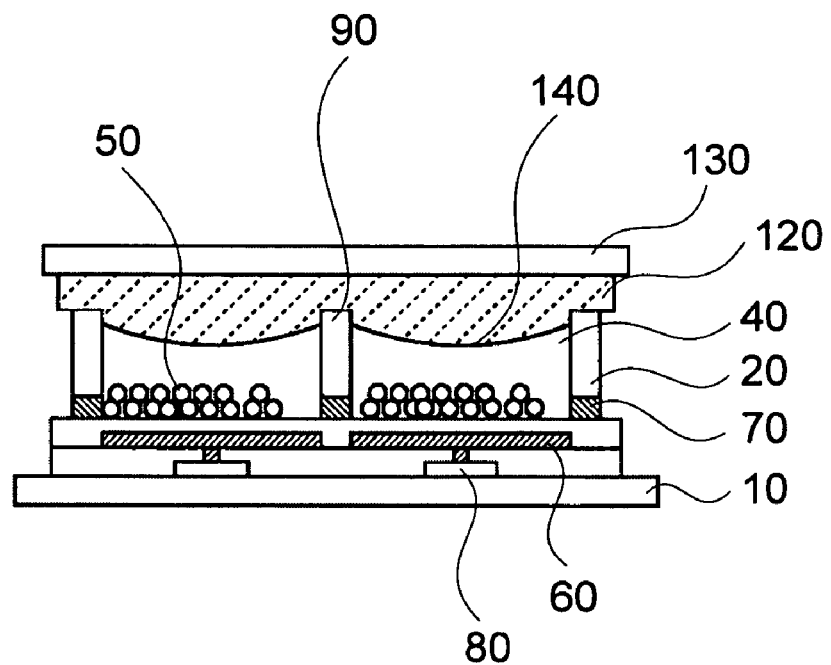

FIG. 4 schematically illustrates Step 2 which is a step until creation of a state immediately before polymerization of a sealing film precursor by disposing a layer of sealing film precursor comprising a polymerizable compound at a desired position.

In such a state, a layer 120 of the sealing film precursor comprising a polymerizable compound is disposed between a supporting member 130 for supporting the sealing film precursor layer 120 and the substrate 10 on which at least the electrophoretic particles 50 and the dispersion medium 40 are disposed between adjacent spacers 20.

Further, in this embodiment, the sealing film precursor layer 120 contacts an exposed surface 140 of the dispersion medium, filled between the adjacent spacers 20, and at least a part of the upper end portion 90 of the spacer 20.

As described above, in this embodiment, the sealing film precursor layer 120 comprising the polymerizable compound is supported by the supporting member 130, so that even if a specific gravity of the sealing film precursor is larger than that of the dispersion medium, the sealing film precursor cannot sink to the bottom of the dispersion medium layer. In other words, there is no limit on the specific gravity of the sealing film precursor. Further, since the sealing film precursor layer 120 is supported by the supporting member, it does not contact ambient air directly, so that a UV polymerizable material which is polymerized, through radical polymerization is used as the polymerizable compound constituting the sealing film precursor. In addition, an occurrence of droplet formation can be obviated, so that, e.g., the thickness of the sealing film can be uniformized over a wide area.

If the above described arrangement of the respective members is realized, there are no limits on method of disposing the sealing film precursor, the dispersion medium, etc. For example, after a mixture (dispersion liquid) comprising the dispersion medium and the electrophoretic particles is filled between adjacent spacers, the supporting member provided with the layer of sealing film precursor may be formed on the spacer formed substrate. Alternatively, after the electrophoretic particles are placed between the adjacent spacers, the supporting member provided with the sealing film precursor layer is disposed opposite to the spacer formed substrate with a predetermined spacing therebetween, and through the spacing, the dispersion medium is injected. Thereafter, the supporting member may be pressed against the spacer formed substrate.

<Step 3>

Figure 5:
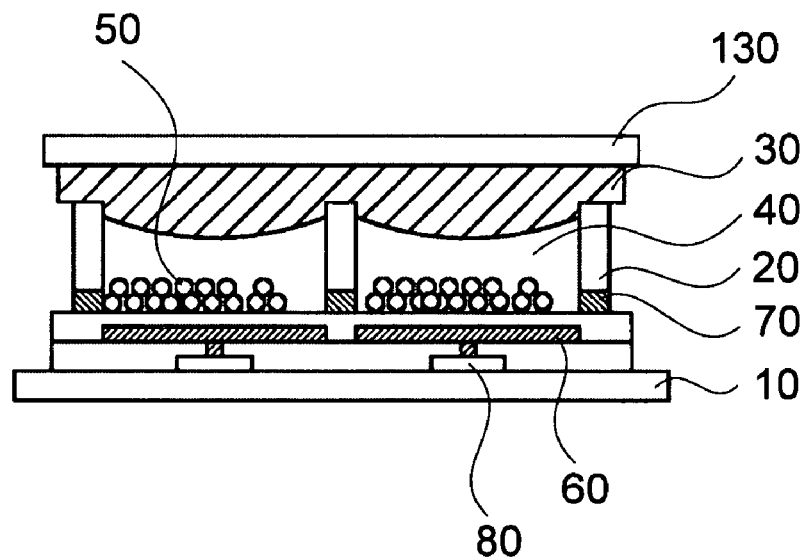

FIGS. 4 and 5 schematic illustrate Step 3 which is step until formation of the sealing film polymerizing the sealing film precursor constituting the sealing film precursor layer 120.

Polymerization of the sealing film precursor is characterized in that it is performed in such a state that the sealing film precursor layer 120 is supported by the supporting member 130 as shown in FIG. 4. By effecting the polymerization in the state, a sealing film 30 is formed as shown in FIG. 5.

The polymerizing method may be selected depending on the kind and property of the polymerizable compound constituting the sealing film precursor. For example, if the polymerizable compound is a UV polymerizable material, the polymerization may be performed by UV irradiation.

It is also possible to remove the supporting member 130 as desired. In this case, the display device as shown in FIG. 1 is formed. After the removal of the supporting member 130, another film may be formed on the sealing film.

Figure 30:
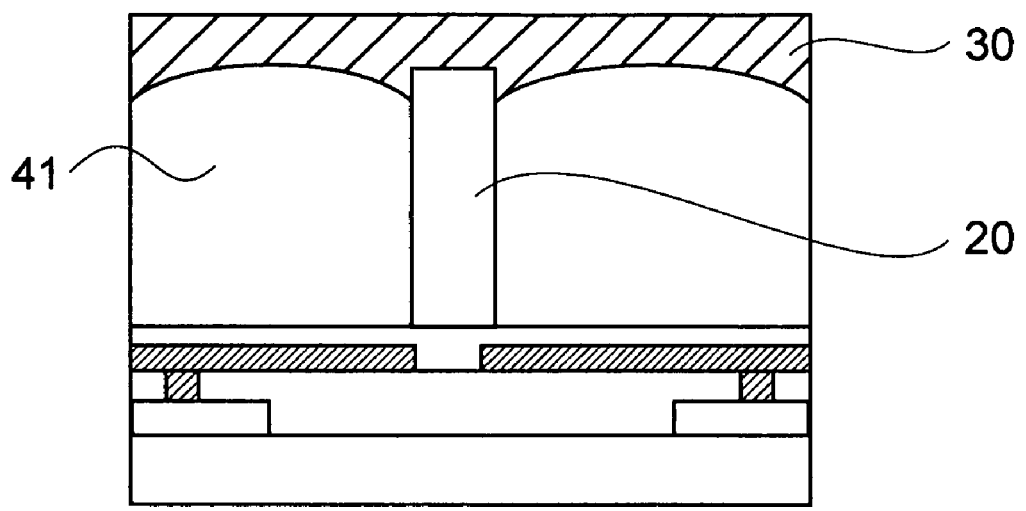
FIG. 30 is a schematic sectional view illustrating an embodiment of an liquid crystal display device produced by the process of the present invention.

FIG. 30 shows a schematic sectional view of the liquid crystal display device to be produced.

The liquid crystal display device shown in FIG. 30 has the same structure as the electrophoretic display device shown in FIG. 1 except that the dispersion medium 40 and the electrophoretic particles 50 are replaced with a liquid crystal material 41 and that the partition wall 20 is replaced with a rectangular column-like structure 20 as a spacer. The spacer 20 shown in FIG. 30 is not used for preventing movement of the liquid crystal material 41 to an adjacent pixel but is used for keeping a thickness of the liquid crystal material 41 at a certain value, so that it may be a member which does not completely partition adjacent pixels. Further, when a surface energy of the sealing film 30 is smaller than a surface energy of the liquid crystal material 41, the liquid crystal molecules 41 are homeotropically aligned with respect to the sealing film 30. In this case, when the surface of the substrate is coated with a homeotropic alignment film 15, the entire liquid crystal molecules of the liquid crystal layer are homeotropically aligned. This alignment mode is employed as the VA mode in a representative liquid crystal display device. In the case where the substrate surface is subjected to a homogeneous (parallel) alignment treatment, the liquid crystal material is placed in such a hybrid alignment state that the liquid crystal molecules are homeotropically aligned at the upper interface of the sealing film and homogeneously aligned at the lower interface of the lower substrate. This mode is also applicable to a liquid crystal display device.

FIGS. 3 to 5 schematically illustrate production steps of the electrophoretic display device but are comparable to those of the liquid crystal display device when the dispersion medium 40 and the electrophoretic particles 50 are replaced with the liquid crystal material 41 (FIG. 30), and the partition wall 20 is replaced with the rectangular column-like structure (spacer) 20 (FIG. 30). Hereinbelow, the production process of the liquid crystal device will be described with reference to FIGS. 31 to 33 in combination with FIGS. 3 to 5.

<Step 1 (FIG. 31)>

In this step, after a substrate 10 is provided with a drive transistor 80 and an electrode 60 and thereon a homeotropic (vertical) alignment film 15 is applied, the rectangular column-like spacer 20 is formed instead of the partition wall 20 (FIGS. 3–5) through photolithography or the like. The spacer 20 can be formed of the same material, e.g., a photoresist, as the partition wall 20 of the electrophoretic display device. Incidentally, in most of liquid crystal display devices, an electric field is applied in a vertical direction, so that an electrode on the substrate 10 may be a single electrode (first electrode) 60.

<Step 2 (FIG. 32)>

In this step, the liquid crystal 41 is applied onto the surface of the homeotropic alignment film 15 on the substrate 10, and a layer 120 of a sealing film precursor comprising a polymerizable compound is applied onto a plate-like supporting member 130 surface. The layer 120 of the sealing film precursor is caused to contact an exposed surface of the liquid crystal 41 and an upper surface of the spacer 20. The supporting member 130 is provided with a transparent (second) electrode 70 at its surface in advance as an opposite electrode to the first electrode 60.

<Step 3 (FIG. 33)>

In this step, a sealing film 30 is formed by polymerizing the sealing agent precursor 120.

The sealing film precursor 120 may comprise the same material as the electrophoretic display device and may preferably have a small surface energy in order to realize the homeotropic alignment state since the resultant surface as the polymerized sealing film 30 is an outermost surface contacting the liquid crystal material.

The sealing film 30 may be disposed only on and contact the spacer 120 from only the viewpoint of sealing function. However, as in the present invention described above, by applying the sealing film onto the entire surface of the supporting member 130, the resultant sealing film functions as not only the sealing film but also an alignment film.

As described later, after the sealing film is formed, it is also possible to leave only the sealing film by peeling off the supporting member. In this case, the sealing film may only be formed in a large thickness so as to provide a strength which is resistance to expansion deformation in the case where it is bent.

In the foregoing description, connection with an electric signal application mean and other steps are omitted.

(2) Hereinbelow, with reference to FIGS. 12–18, an embodiment of the production process according to the second aspect of the present invention will be specifically described.

Figure 12:
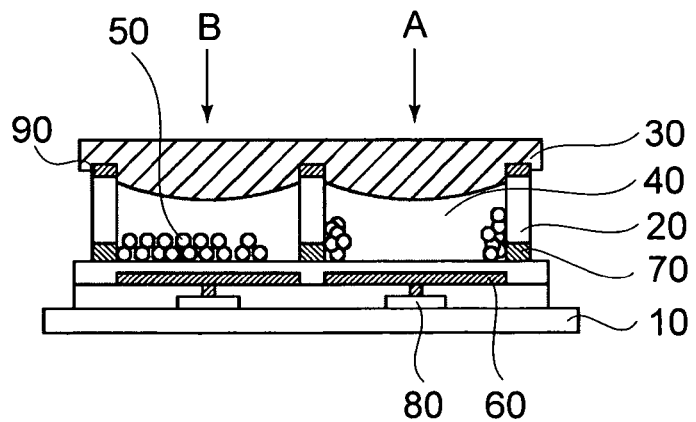

FIG. 12 is a schematic sectional view showing an embodiment of the display device produced through the production process of this embodiment.

Referring to FIG. 12, the display device includes a substrate 10, spacers 20 disposed so as to surround and define pixels, a sealing film 30 to be formed by polymerizing a sealing film precursor comprising a polymerizable compound as described later, a dispersion medium 40, electrophoretic compounds 50, a first electrode 70 disposed at each pixel, a second electrode disposed at each pixel, and a switching device 80, such as TFT (thin film transistor), disposed with respect to each pixel, and a bonding film 90 for enhancing adhesive properties between the spacer 20 and the sealing film 30. The bonding film is formed by polymerizing a bonding film precursor, comprising the polymerizable compound, disposed on an upper end portion of the spacer 20 before the polymerization. In the polymerization process, the bonding film and the sealing film are connected and bonded to each other. From FIG. 12, other structural members for the display device, such as an electric signal application means for applying an electric signal between the electrodes are omitted.

The display device produced through the production process of the present invention reflects a distribution state of the electrophoretic particles 50 in a display state.

More specifically, in an area indicated by A in FIG. 12, a distribution state wherein the electrophoretic particles 50 gather on the spacer 20 side is shown. When the area A is observed from the sealing film 30 side of the display device, the area A looks white if the surface of the first electrode 60 is white. On the other hand, in an area indicated by B in FIG. 12, a distribution state wherein the electrophoretic particles 50 are dispersed in the substrate surface direction is shown. When the area B is observed from the sealing film 30 side, the area B looks like the color of the electrophoretic particles 50.

The method of changing the display state is the same as in that in the embodiment according to the first aspect of the present invention.

In FIG. 12, the electrode system (structure) is disposed on the substrate 10 side. The electric field created by the electrode system largely displaces the electrophoretic particles in the planar direction of the sealing film. In this embodiment, however, it is also possible to adopt an electrode structure for largely displacing the electrophoretic particles in the vertical direction of the sealing film as long as a desired display state is created.

Figure 15:
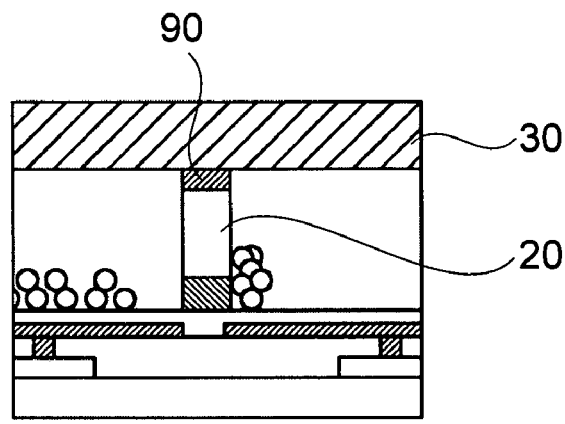
Figure 16:
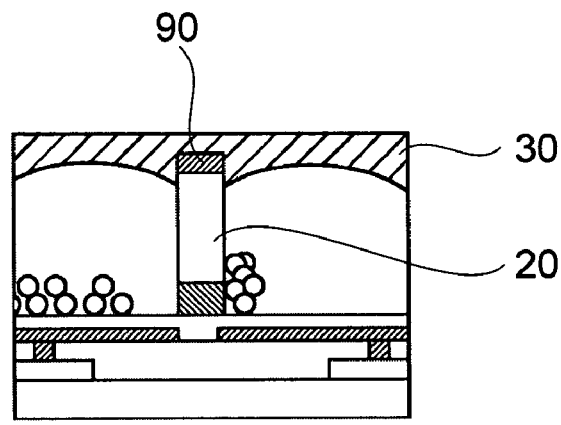

The sealing film 30 shown in FIG. 12 has such a sectional configuration (shape) that it is curved toward the substrate side but may also have a planar configuration or such a configuration that it is curved toward a direction opposite to the substrate, as shown in FIGS. 15 and 16, respectively.

Figure 13:
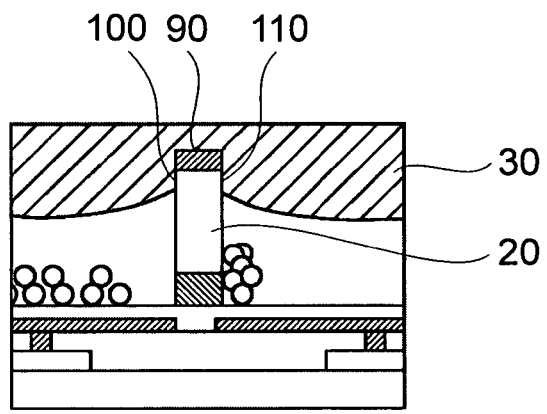
FIGS. 13, 14, 15, 16 and 17 are respectively an enlarged sectional view of the display device showing a portion in the neighborhood of a spacer 20.
Figure 14:
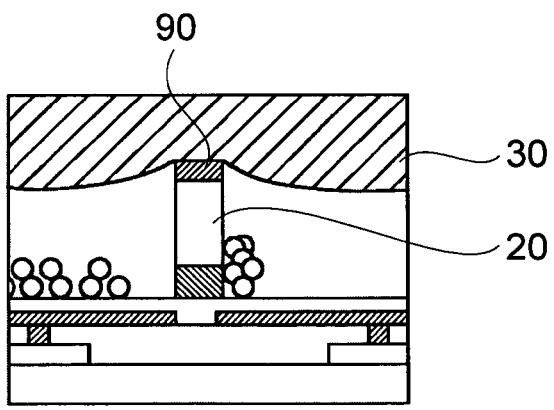
Figure 17:
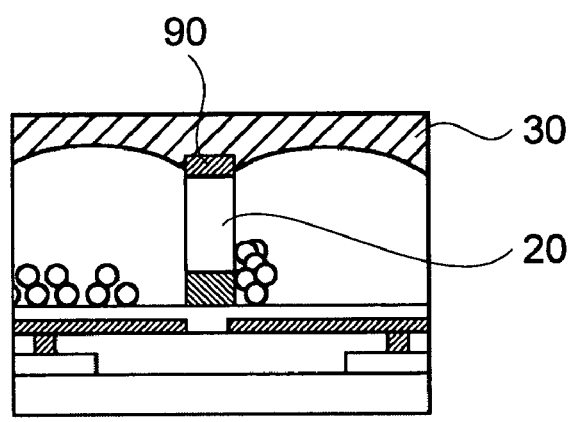

The sealing film is sufficient if it is adhered to at least a part of the upper end portion of the spacer but may preferably be adhered to the entire surface of the upper end portion of the spacer as shown in, e.g., FIGS. 14, 15 and 17, more preferably be adhered to not only the entire surface of the upper end portion of the spacer as shown in, e.g., FIGS. 13 and 16. This is because as an adhered area of the sealing film to the spacer becomes larger, adhesive properties between the sealing film and the spacer also become larger. FIG. 13 schematically shows such a state that the sealing film which is curved toward the substrate 10 side adheres to the upper end portion 90 and a part of side portions 100 and 110 of the spacer 20.

Figure 18:
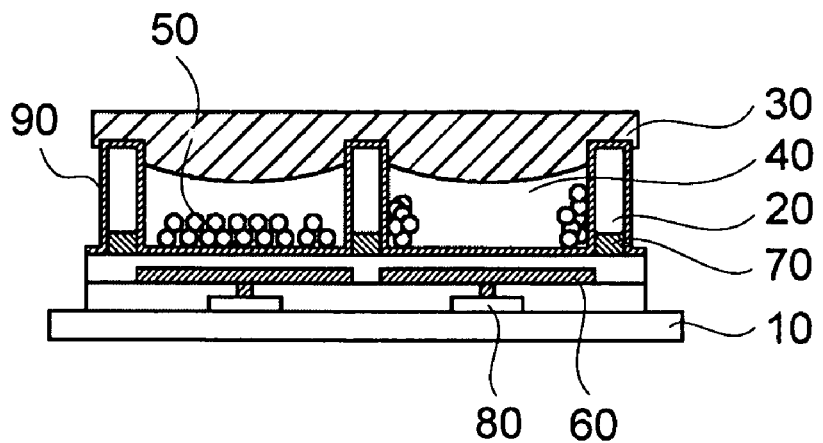
FIG. 18 is a schematic sectional view illustrating another embodiment of an electric display device produced through the process of the present invention.

In this embodiment, before the polymerization, at least the upper end portion of the spacer is constituted by the bonding film precursor layer. In FIGS. 12–17, only the upper end portion is constituted by the bonding film precursor layer. In this embodiment, however, the polymerizable compound may be disposed at not only the upper end portion but also the entire surface of side portions of the spacer, followed by polymerization to form a bonding film 90 as shown in FIG. 18.

Next, an embodiment of the production process of the display device shown in FIG. 12 will be explained with reference to process drawings of FIGS. 19–26.

<Step 1>

Figure 19:
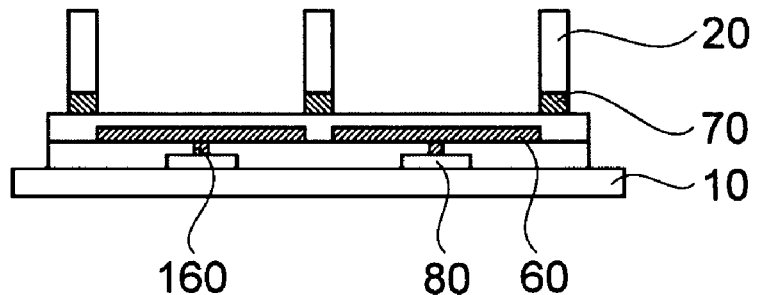
FIGS. 19 to 28 are schematic sectional views for illustrating the production processes of display devices of the present invention.

FIG. 19 schematically illustrates Step 1 which is a step until formation of the spacer 20.

First, on he substrate 10, switching devices 80 are formed and then covered with an insulating layer. In the insulating layer, contact holes 160 are provided. Thereafter, on the insulating layer, a resist pattern for scattering incident light is formed, and thereon, a first electrode 60 (of, e.g., aluminum exhibiting a high light reflectance) is formed so as to be connected with the switching device 80 through the contact hole 160. If the first electrode 60 has the highlight reflectance, it also functions as a light reflecting/scattering layer.

The first electrode 60 is covered with an insulating light scattering layer. On the light scattering layer, a second electrode 70 and a spacer 20 are formed. The spacer may be formed through any method as long as a desired spacer can be formed. For example, the spacer can be formed through a known photolithographic process.

<Step 2>

Figure 20:
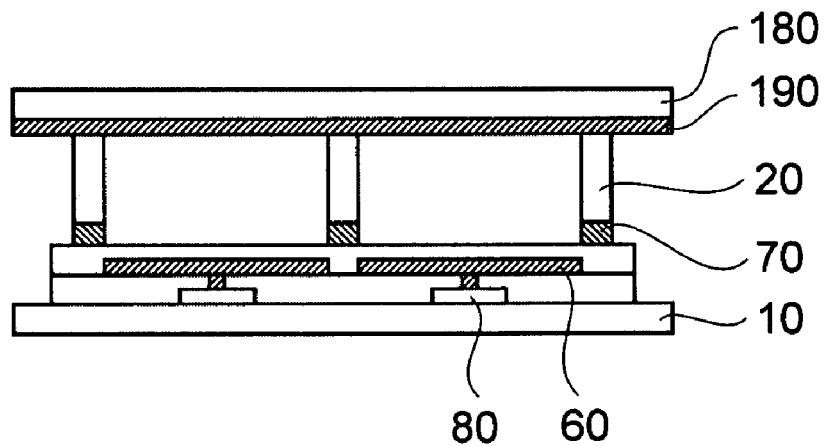
Figure 21:
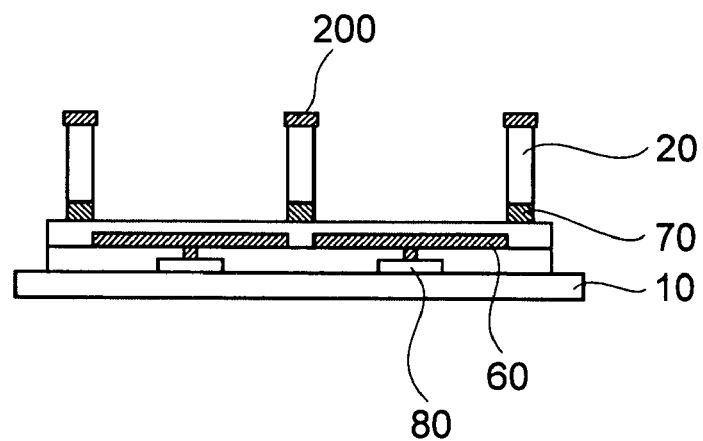
Figure 22:
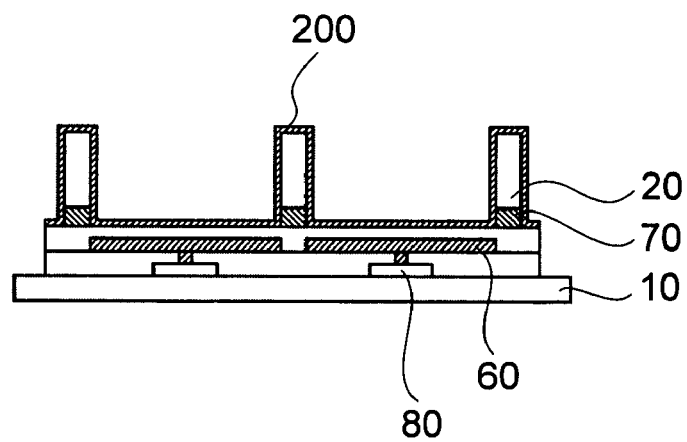

FIGS. 20–22 schematic illustrate Step 2 which is a step until disposition o the layer of bonding film precursor comprising a polymerizable particle at least at an upper end portion of the spacer.

The polymerizable compound used in this step may preferable be identical to that constituting a precursor for the sealing film described later.

A specific example of Step will be described.

First, a substrate onto which a polymerizable compound is applied is prepared. The applied surface of the substrate is caused to contact the upper end portion of the spacer prepared in Step 1 as shown in FIG. 20. Referring to FIG. 20, a reference numeral 190 represents a polymerizable compound applied onto a substrate 180. Thereafter the substrate 180 is removed from the spacer 20, whereby the polymerizable compound 190 is transferred from the substrate 180 to the upper end portion of the spacer 20 as shown in FIG. 21. Referring to FIG. 21, a reference numeral 200 represents a layer of bonding film precursor comprising the polymerizable compound transferred onto the upper end portion of the spacer 20.

In this embodiment, the polymerizable compound 200 may also be disposed at the entire surface of side portions of the spacer 20 as well as at the upper end portion as shown in FIG. 22. Such a disposition of the polymerizable compound may be performed by, e.g., coating or adsorption of the polymerizable compound.

In the case where the spacer is formed of a polymerizable compound constituting the sealing film precursor, the polymerizable compound has already been disposed also at the upper end portion of the spacer, so that the above-mentioned disposition of polymerizable compound (by, e.g., transfer or coating) may be omitted or performed as desired.

The polymerizable compound may preferably have an affinity to the spacer. This is because not only the disposition of the polymerizable compound at the upper end portion of the spacer is readily performed but also adhesive properties, after the polymerization of the polymerizable compound, between a polymer of the polymerizable compound and the spacer become good.

In case of necessity, a treatment for improving the adhesive properties of the polymer of polymerizable compound disposed at least at the upper end portion of the spacer with the upper end portion of the spacer may be effected. For example, it is possible to improve the adhesive properties by forming a minute unevenness at the spacer upper end portion by, e.g., dry etching. Alternatively, it is also possible to chemically fix the polymerizable compound at least to the upper end portion of the spacer, e.g., by utilizing a functional group (such as —OH or —COOH) formed by ozone treatment to at least the spacer upper end portion. Further, it is also possible to partially polymerize the layer of bonding film precursor.

<Step 3>

Figure 23:
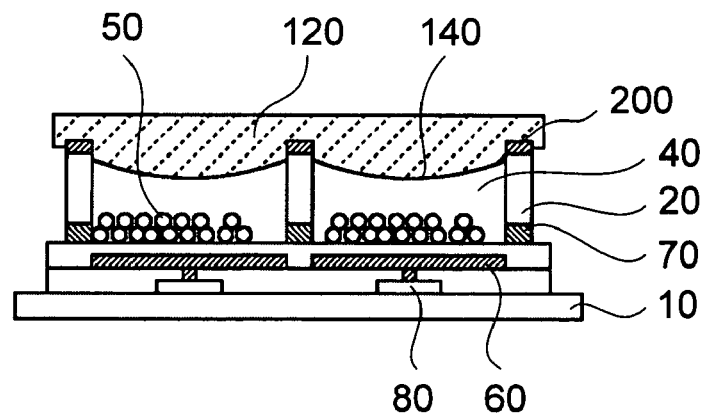
Figure 24:
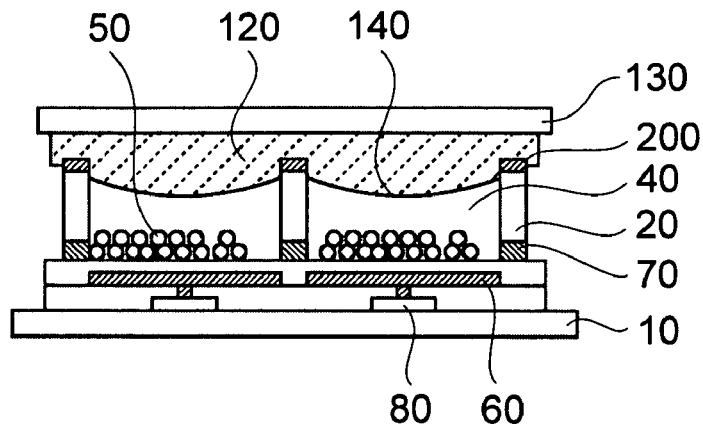

FIGS. 23 and 24 schematically illustrate Step 3 which is a step until creation of a state immediately before polymerization of a sealing film precursor by disposing a layer of sealing film precursor comprising a polymerizable compound at a desired position.

In such a state, in this embodiment, the sealing film precursor layer 120 contacts an exposed surface 140 of the dispersion medium, filled between the adjacent spacers 20, and at least a part of the upper end portion of the spacer 20 as shown in FIG. 23.

As described above, in this embodiment, at least the upper end portion of the spacer is constituted by the bonding film precursor layer 200 comprising the polymerizable compound. For this reason, when the polymerization process described later is performed, the polymer of the sealing film precursor and the polymer of the bonding film precursor (i.e., the bonding film) connects to each other, so that adhesive properties therebetween can be improved.

The polymerizable compound used in this embodiment is characterized in that it is not soluble (mixed) in the dispersion medium. For this reason, when the layer of sealing film precursor is disposed on the dispersion medium in this embodiment, a part of the dispersion medium present between the sealing film precursor and the spacer present between the sealing film precursor and the spacer flows out of the structure. The flowing out phenomenon of the dispersion medium is accelerated by not only the sealing film precursor layer but also the polymerizable compound constituting the bonding film precursor dispersed at the upper end portion. Even when a slight part of the layer of sealing film precursor contacts that of the spacer upper end portion, they begin to contact each other as if a zipper is closed. At the same time, the flowing out phenomenon of the dispersion medium is further accelerated. As a result, it becomes possible to realize, with reliability, the contact of the layer of sealing film precursor with the spacer required to ensure bonding between the sealing film and the spacer even in the dispersion medium.

In this step, the sealing film precursor layer 120 comprising the polymerizable compound may be supported by the supporting member 130 as shown in FIG. 24, so that even if a specific gravity of the sealing film precursor is larger than that of the dispersion medium, the sealing film precursor cannot sink to the bottom of the dispersion medium layer. In other words, there is no limit on the specific gravity of the sealing film precursor. Further, since the sealing film precursor layer 120 is supported by the supporting member, it does not contact ambient air directly, so that a UV polymerizable material which is polymerized, through radical polymerization is used as the polymerizable compound constituting the sealing film precursor. In addition, an occurrence of droplet formation can be obviated, so that, e.g., the thickness of the sealing film can be uniformized over a wide area.

If the above described arrangement of the respective members is realized, there are no limits on method of disposing the sealing film precursor, the dispersion medium, etc. For example, a polymerizable compound or a volatile liquid in which the polymerizable compound is dissolved may be minutely sprayed onto an upper end portion (exposed surface) of the dispersion medium. The polymerizable compound used in this embodiment is insoluble in the dispersion liquid, so that the polymerizable compound is localized as a thin film at the exposed surface of the dispersion liquid. This phenomenon is liable to occur when the polymerizable compound has —OH group or —O— group. As described later, the polymerizable compound in this embodiment has such a group in its structure.

Further, the polymerizable compound may be applied onto the exposed surface and the layer of bonding film precursor.

If necessary, the layer of bonding film precursor may have a laminated structure including two or more layers. For example, on a first layer contacting the exposed surface of the dispersion liquid, a second layer of the polymerizable compound may be disposed. For example, the second layer may be prepared by applying the polymerizable compound onto the first layer without using the above described supporting member. The first layer may be prepared by the minute spray method as described above. The first layer may be formed of the polymerizable compound or a polymer of the polymerizable compound.

On the other hand, after a mixture (dispersion liquid) comprising the dispersion medium and the electrophoretic particles is filled between adjacent spacers, the supporting member provided with the layer of sealing film precursor may be formed on the spacer formed substrate. Alternatively, after the electrophoretic particles are placed between the adjacent spacers, the supporting member provided with the sealing film precursor layer is disposed opposite to the spacer formed substrate with a predetermined spacing therebetween, and through the spacing, the dispersion medium is injected. Thereafter, the supporting member may be pressed against the spacer formed substrate.

<Step 4>

Figure 25:
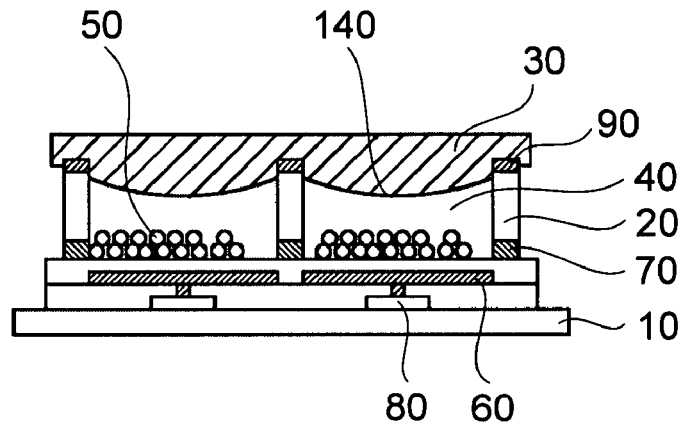
Figure 26:
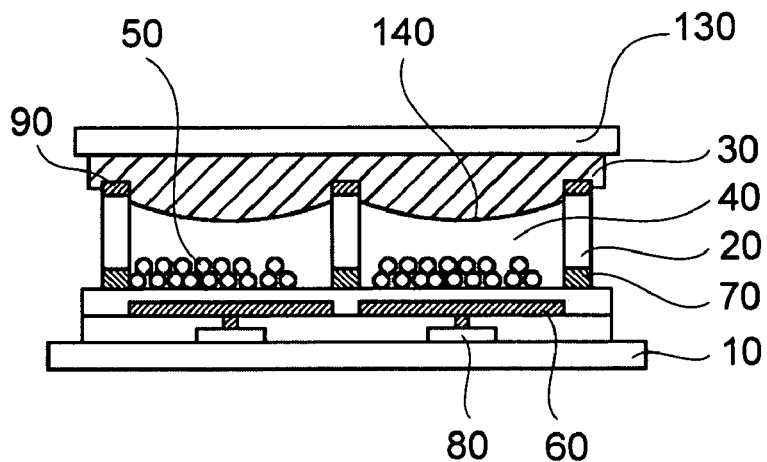
Figure 27:
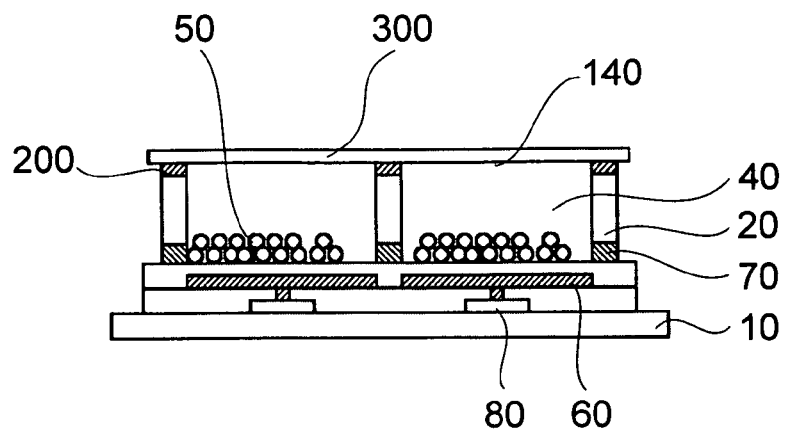
Figure 28:
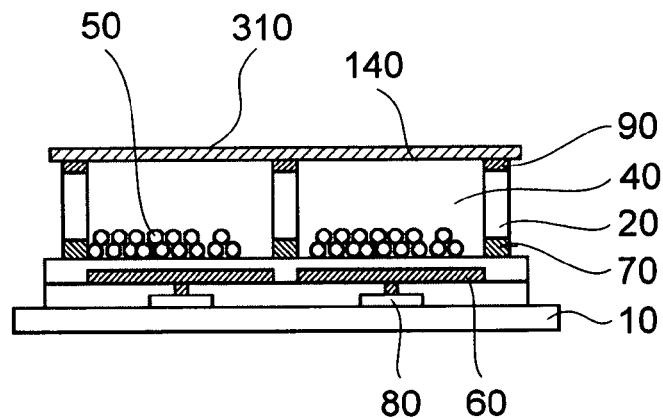
Figure 29:
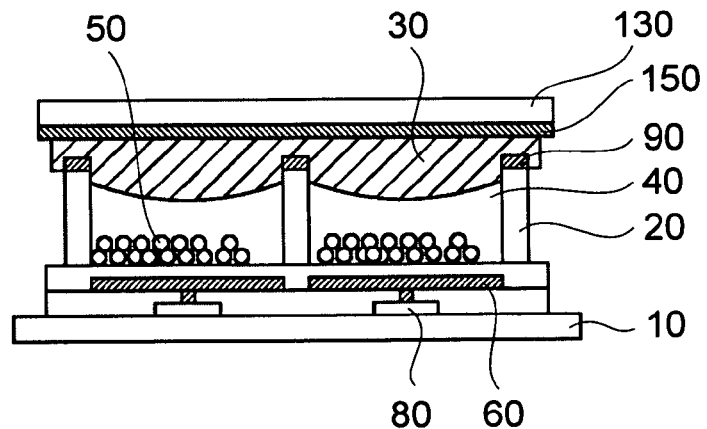
FIG. 29 is a schematic sectional view illustrating another embodiment of an electric display device produced through the process of the present invention.

FIGS. 25 and 26 schematic illustrate Step 4 which is step until formation of the sealing film polymerizing the sealing film precursor constituting the sealing film precursor layer 120 and the bonding film precursor constituting the bonding film precursor layer 200 disposed on the spacer upper end portion.

By effecting the polymerization of the sealing film precursor shown in FIGS. 23 and 24, a sealing film 30 is formed as shown in FIGS. 25 and 26. At the same time, the bonding film precursor is also polymerized to form the bonding film 90.

By the polymerization in this step, the polymerizable compound constituting the bonding film precursor layer disposed at least at the spacer upper end portion and the polymerizable compound constituting the sealing film precursor are bonded to each other, so that adhesive properties between the sealing film and the bonding film. On the other hand, the bonding film is bonded to the upper end portion of the spacer as described above. Accordingly, the adhesive properties of the sealing film prepared in this step with the spacer are ensured.

The polymerizing method may be selected depending on the kind and property of the polymerizable compound constituting the sealing film precursor. For example, if the polymerizable compound is a UV polymerizable material, the polymerization may be performed by UV irradiation.

It is also possible to remove the supporting member 130 in the case of the display device shown in FIG. 26. In this case, the display device as shown in FIG. 25 is formed. After the removal of the supporting member 130, another film may be formed on the sealing film. Similarly, another film may also be formed on the sealing film of the display device shown in FIG. 25.

In the foregoing description, connection with an electric signal application mean and other steps are omitted.

(3) Hereinbelow, materials on the like applicable to the embodiments of the production processes according to the first and second aspects of the present invention will be specifically described.

The dispersion medium used in the present invention is an insulating liquid. As the insulating liquid, it is possible to use an organic solvent, such as isoparaffin (e.g., trade name: "Isopar", mfd. by Exxon Corp.), silicone oil, xylene or toluene. The surface nenrgy of Isopar was measured to be 23 dyn/cm.

The electrophoretic particles are not particularly restricted in material, particle size and color as long as they can effect a desired display. It is preferable that a material therefor is colored and possesses good negative or positive chargeability. Examples of such material may include various inorganic and organic pigments, carbon black and resins containing the pigments or carbon black. The particle size of the exposed surfaces may generally be ca. 0.01–50 µm, preferably ca. 0.1–10 µm.

In the above-mentioned insulating liquid or the electrophoretic particles, a charge control agent for controlling and stabilizing chargeability of the electrophoretic particles may be added. Examples of the charge control agent may include succinimide, monoazo dye metal complex salt, salicyclic acid, organic quaternary ammonium salt, and nigrosin compound.

Next, the sealing film precursor used in the present invention will be described.

The sealing film precursor may preferably be liquid and is characterized by being insoluble in the dispersion medium described above.

Herein, the term "insoluble" or "not soluble" means that two compounds (e.g., the sealing film precursor and the dispersion liquid) have a larger difference in solubility parameter. The difference may generally be not less than 0.1, preferably not less than 0.5, more preferably not less than 1.0. Further, the sealing film precursor is characterized by having a small affinity to the electrophoretic particles and by not dissolving therein the electrophoretic particles.

The polymerizable compound constituting such a sealing film precursor is not particularly limited so long as it can form a desired sealing film, but may preferably have a partial structure having at least one group selected from the group consisting of —O—, —$CH_2$O—, —OH and —$CH_2$—.

By having such a partial structure, the resultant sealing film is not mixed (dissolved) in the dispersion medium. Further, it is also possible to control a physicochemical interaction between the resultant sealing film and the electrophoretic particles. As described above, when the polymerizable compound has the above-mentioned partial structure, it is effective in not only producing the sealing film but also controlling the functions of the sealing film. Adhesion (force) between the electrophoretic particles and the sealing film is an example of the physicochemical interaction and can be controlled by surface energy of the sealing film. As the surface energy of the sealing film is smaller, the resultant adhesion can be made smaller.

The polymerizable compound having the partial structure of —$CH_2$—O— may include polymerizable compounds having a unit of —$CH_2$—$CH_2$—O—, a polyethylene glycol unit of $CH_2$—$CH_2$O$)_n$ (n: integer), or a unit of —$CH_2$—O—$CH_2$—$CH_2$—$CH_2$—$CH_2$—O—$CH_2$—.

Further, the polymerizable compound having the partial structure of —O— may include polymerizable compounds having adjacent groups —O— and —$CH_2$— (e.g., polyethylene glycol type) or having a unit not containing adjacent —$CH_2$— group (e.g., carbonate linkage).

The polymerizable compound having the partial structure of —$CH_2$— may include polymerizable compounds having a unit of repetitive —$CF_2$— group.

The polymerization process for the sealing film is not restricted as long as a desired sealing film can be prepared. For example, the sealing film can be formed through a photopolymerization process represented by UV polymerization.

In the case of employing the UV polymerization, it is possible to utilize a radical-polymerizable acrylate or methacrylate compound, having the partial structure of —OH, —$CH_2$—O—, —O—, —$CF_2$—, as the polymerizable compound. For example, such a (meth-)acrylate compound may include: 2-hydroxyethyl methacrylate; 1,4-butanediol diglycidyl ether diacrylate; polyethyleneglycol monomethacrylate (e.g., "Blenmer PE" series, mfd. by Nippon Yushi K.K.); polytetramethylene ether glycol=di(2-maleimide acetate) (e.g., "MIA 200", mfd. by Dainippon Ink And Chemicals, Inc.); 1H,1H,5H-octafluoropentyl acrylate (e.g., "V-8F", mfd. by Osaka Yuki Kagaku Kogyo K.K.) ; and 1H,1H,2H,2H-heptadecafluorodecyl acrylate (e.g., "V-17F", mfd. by Osaka Yuki Kagaku Kogyo K.K.).

The polymerizable compound may be a polymerizable monomer or a polymerizable oligomer. These monomer and oligomer may be monofunctional compounds or polyfunctional compounds. Further, the polymerizable compound may be a mixture of the monomer and the oligomer or a mixture of the monofunctional and polyfunctional compounds.

The polymerizable compound may be polymerized by irradiating it with light (e.g., UV light) in the presence of a photopolymerization initiator, such as "Irgacure 184" or "Irgacure 641" both available from Ciba Speciality Chemical K.K.) or "MIA 200" available from Dainippon Ink And Chemicals Inc.

The supporting member is not limited so long as a desired sealing film can be formed but the surface thereof may preferably have an affinity or compatibility to the sealing film precursor. Based on the affinity, e.g., in the above-mentioned Step 2, the supporting member can effectively support the layer of sealing film precursor.

As such a supporting member applicable to the present invention, it is possible to use not only a soft (flexible) substrate of PET (polyethylene terephthalate), PC (polycarbonate), PES (polyethersulfone), etc., but also a hard substrate of glass, quartz, etc. The supporting member may preferably be transparent. Further, in the case where a light wavelength region for the photopolymerization described above is UV region, the supporting member is also required to exhibit UV transmission properties.

If the supporting member surface has no affinity to the sealing film precursor, it is required to undergo an affinity-imparting treatment, e.g., by disposing a film of polymer of the polymerizable compound constituting the sealing film precursor at the supporting member surface. It is also possible to use other methods as long as they can impart the affinity (to the sealing film precursor) t the supporting member surface.

The spacer applicable to the present invention may include a thick film of a cured product of a photoresist (e.g., "SU-8", mfd. by Minesota Mining & Manufacturing Co.).

The upper end portion of the spacer may preferably have an affinity to the sealing film precursor. Based on the affinity, the following advantages are attained. First, it is possible to ensure adhesive properties between the spacer upper end portion and the sealing film. Secondly, e.g., in Step 2 of the embodiment of the production process according to the first aspect of the present invention, it is possible to prevent the dispersion medium from entering the contact portion of the layer of sealing film precursor with the spacer. This is because the sealing film precursor and the dispersion medium are insoluble in each other and the sealing film precursor has the affinity to the spacer upper end portion. In other words, the dispersion medium located between the sealing film precursor layer and the spacer upper end portion is caused to sufficiently flow out.

If the spacer upper end portion has no desired affinity to the sealing film precursor, it is required to undergo an affinity-imparting treatment, e.g., by applying the polymerizable compound constituting the sealing film precursor or a polymer of the polymerizable compound at the spacer upper end portion and in the vicinity thereof. It is also possible to use other methods as long as they can impart the affinity (to the sealing film precursor) to the spacer upper end portion and the vicinity thereof.

The substrate, on which the spacer is formed, used in the present invention is not particularly limited. As such a substrate, it is possible to use not only a soft (flexible) substrate of PET (polyethylene terephthalate), PC (polycarbonate), PES (polyethersulfone), etc., but also a hard substrate of glass, quartz, etc. The substrate surface contacting the dispersion medium may preferably have an affinity to the dispersion medium but has no property of being dissolved in the dispersion medium.

The material and arrangement of the electrodes used in the present invention are also not largely restricted so long as they can realize a desired display. The material for the electrodes may be Al or ITO (indium tin oxide). The electrode arrangement is not particularly limited so long as it can induce a desired displacement of the electrophoretic particles required to cause necessary change in display state. In the case of using the above-mentioned first electrode 60 as also the light reflection layer, a high light-reflective material such as silver (Ag) or aluminum (Al) may suitably be used. In the case of using the first electrode 60 as an electrode for white display, the first electrodes per se is provided with a surface unevenness so as to cause irregular reflection of light. Alternatively, on the first electrode, a light scattering layer may be formed.

Hereinbelow, the present invention will be described based on Examples.

Surface energy values of the sealing film precursors used in the following examples are shown in Table 1.

TABLE 1

| sealing film precursor | surface energy(dyn/cm) |
|---|---|
| polytetramethylene ether glycol = di (2-maleimide acetate) ("MIA 200", mfd. by Dainippon Ink And Chemicals, Inc.) | 49 |
| 1,4-butanediol diglycidyl ether diacrylate | 41 |
| 1H,1H,5H-octafluoropentyl acrylate ("V-8F", mfd. by Osaka Yuki Kagaku Kogyo K.K.) | 28 |
| 1H,1H,2H,2H-heptadecafluorodecyl acrylate ("V-17F", mfd. by Osaka Yuki Kagaku Kogyo K.K.) | 12 |

EXAMPLE 1

An electric display device as shown in FIG. 1 was prepared.

The resultant display device has 200×600 pixels each has a size of 240 μm×80 μm. Each pixel is surrounded by a spacer 20 having a width of 8 μm and a height of 28 μm. A first electrode 60 is located between the adjacent spacers 20 and is connected to a switching device 80. A second electrode 70 is located between the spacer 20 and a substrate 10. The second electrode 70 is an electrode which is common to all the pixels.

A specific production process of the display device in this embodiment will be described with reference to FIGS. 3–5 and 10.

On a 0.1 mm-thick stainless steel substrate 10, a switching device 80 was formed. Then the substrate was coated with an insulating layer of acrylic resin, and the insulating layer was provided with a contact hole. Thereafter, on the insulating layer, a resist pattern for scattering incident light was formed and thereon, a first electrode 60 of aluminum was formed and electrically connected with the switching device 80 disposed on the substrate 10 through the contact hole. The first electrode 60 was covered with an acrylic resin layer. The first electrode 60 in this example also functioned as a light reflection/scattering layer (FIG. 3). On the acrylic resin layer, a second electrode 70 of dark black titanium carbide and a spacer 20 of a pured product of a photoresist ("SU-8", mfd. by 3M) were formed in thick film by a known photolithographic process. After the formation of the second electrode 70, the surface of the acrylic resin layer on the first electrode 60 and the surface of the second electrode 70 were coated with a layer of polycarbonate.

Figure 10:
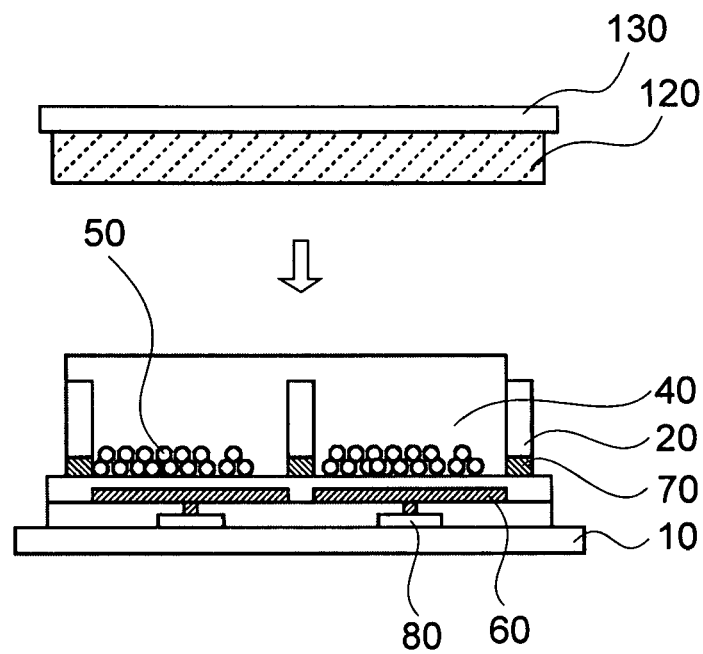
FIG. 10 is a schematic sectional view or illustrating the production process of the display device of the present invention.
Figure 11:
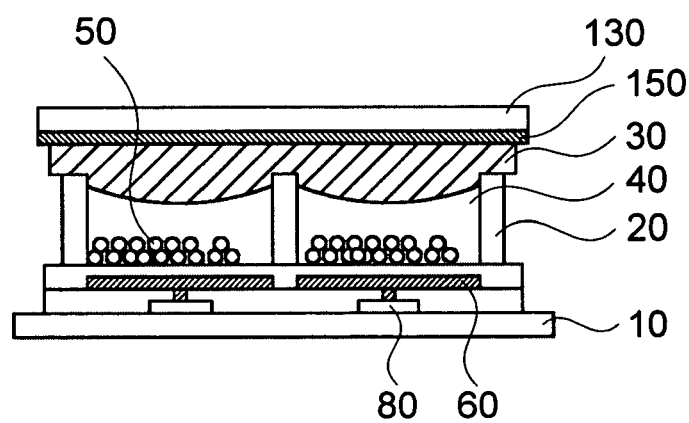
FIGS. 11 and 12 are respectively a schematic sectional view illustrating another embodiment of an electric display device produced through the process of the present invention.

After the coating, a dispersion liquid comprising a dispersion medium 40 and electrophoretic particles 50 was filled at each pixel (FIG. 10). As the dispersion medium 40, isoparaffin (trade name: "Isopar H"; specific gravity: 0.76; mfd. by Exxon Corp.) was used. The surface energy of Isopar H is 23 dyn/cm. As the electrophoretic compounds 50, particles (average particle size: 1–2 μm) of a styrene-methyl methacrylate copolymer resin containing carbon black were used. In the isoparaffin, succinimide (trade name: "OLOA1200", mfd. by Shevron Corp.) was added as a charge control agent.

On the other hand, on a PET substrate as a supporting member 130, a layer 120 of sealing film precursor was formed (FIG. 10). As the sealing film precursor, a mixture of 85 wt. parts of 1H,1H,2H,2H-heptadecafluorodecyl acetate (trade name: "V-17F"; specific gravity: not less than 1; mfd. by Osaka Yuki Kagaku Kogyo K.K.) and 15 wt. parts of 1H,1H,5H-octafluoropentyl acrylate (trade name: "V-8F" specific gravity: not less than 1 mfd. by Osaka Yuki Kagaku Kogyo K.K.) being a UV curable monomer was used. The surface energy of this acrylate monomer is 14 dyn/cm.

This acrylate monomer and Isopar H (as the dispersion medium) are not soluble in each other and the acrylate monomer has a specific gravity larger than that of Isopar H. Polytetramethylene ether glycol=di(2-maleimide acetate) (trade name: "MIA200"; specific gravity: not less than 1; mfd. by Dainippon Ink. And Chemicals, Inc.) is added as a photopolymerization initiator.

The sealing film precursor layer 120 was formed in a thickness of 7 μm by spin-coating.

Thereafter, the supporting member 130 was placed on the spacer 20 and the dispersion medium 40 so that the sealing film precursor layer 120 contacted the spacer 20 and the dispersion medium 40 (FIG. 10). After the lapse of several seconds from the contact, the sealing film precursor layer 120 pushed the dispersion liquid away to contact the spacer 20, whereby a state in which the sealing film precursor layer 120 covered the upper end portion and a part of the side portion of the spacer 20 and the exposed (outer) surface of the dispersion liquid was finally created. The contact angle of the precursor at the side portion of the spacer is less than 90 degrees similarly to FIG. 8. This is because the surface energy of the precursor is smaller than the dispersion liquid.

After such a state was created, the resultant structure was subjected to UV irradiation for 5 minutes at an intensity of 0.3 mW/cm at room temperature to effect polymerization of the sealing film precursor. As a result, a cured sealing film 30 was formed.

After the polymerization, when the resultant display device was viewed from the side closer to the sealing film 30, the electrophoretic particles 50 were not observed at the upper end portion of the spacer 20 and within the sealing film 30. In other words, during the polymerization process, the electrophoretic particles 50 were not incorporated into the sealing film 30.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state.

Even when such a drive of the display device was continued, a phenomenon that the electrophoretic particles 50 were displaced so as to flow over the spacer 20 was not observed. In other words, it was confirmed that the dispersion liquid was confined by the sealing film, the spacer, and the substrate. It was also confirmed that the sealing film was bonded to the spacer without being peeled off.

Reference Example 1

An electric display device was prepared in the same manner as in Example 1 except that the sealing film precursor was changed to 1,4-butanediol diglycidyl ether diacrylate (trade name: "NK oligo EA-5520"; specific gravity: not less than 1; mfd. by Shin Nakamura Kagaku Kogyo K.K.) and that "MIA200" was changed to "Irgacure 184", (Ciba-Gaigy, Ltd.). The mixture is not soluble in Isopar H and has a specific gravity larger than Isopar H.

The contact angle of the precursor to the spacer is larger than 90 degrees, which is illustrated in FIG. 4.

EXAMPLE 2

A liquid crystal display device as shown in FIG. 30 was prepared.

Small structures 20 which are to constitute spacers of the liquid crystal device are formed on the substrate 10. The lateral cross section of the small structure is 10 μm square and the height of the structure is 3 μm.

The top of the spacers 20 are adhered to a sealing film 30. The sealing film 30 is mounted on a surface of a supporting member 130. The support member 130 is used for supporting the sealing film 30 when it is casted in a liquid state to form a layer before polymerized.

A nematic liquid crystal 41 is deposited on the substrate 10. The liquid crystal aligns homeotropically.

A specific production process of the display device in this embodiment will be described with reference to FIGS. 31–33.

Figure 31:
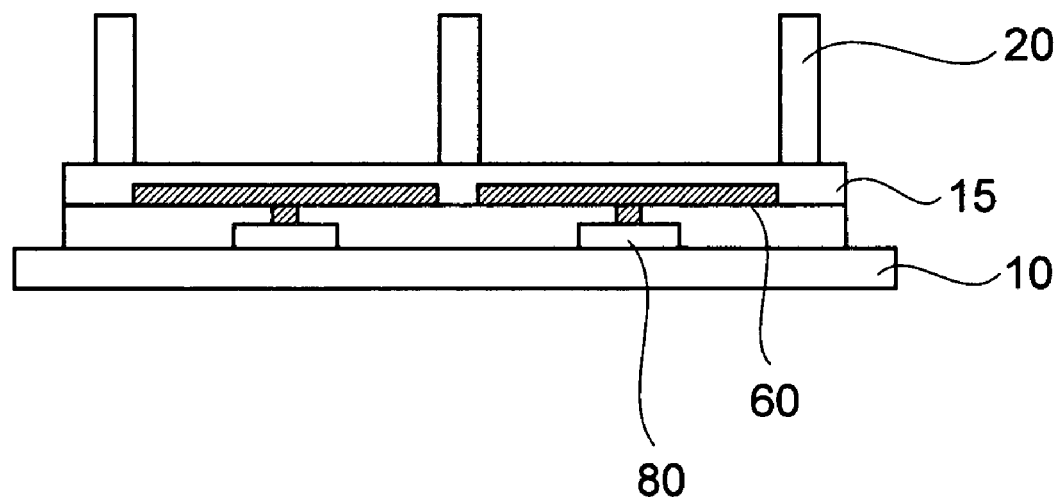
FIGS. 31, 32 and 33 are schematic views for illustrating the process for producing the liquid crystal display device according to the present invention.

A first electrode 60 of aluminum is provided on a 0.1 mm-thick stainless steel substrate 10 (FIG. 31). A TFT 80 is formed on the substrate 10 and connected to the first electrode 60. The first electrode 60 is covered with a polyimide resin layer 15 with a surface energy of 30 dyne/cm. The first electrode 60 in this example also functioned as a light reflection/scattering layer. On the polyimide resin layer 15, spacers 20 of a photoresist ("SU-8", mfd. by 3M) are formed by a known photolithographic process.

Figure 32:
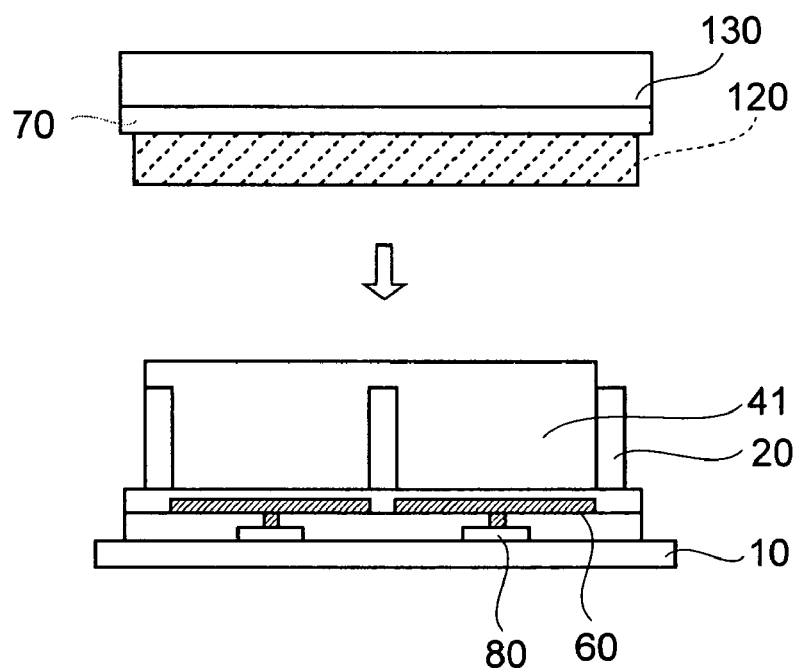
Figure 33:
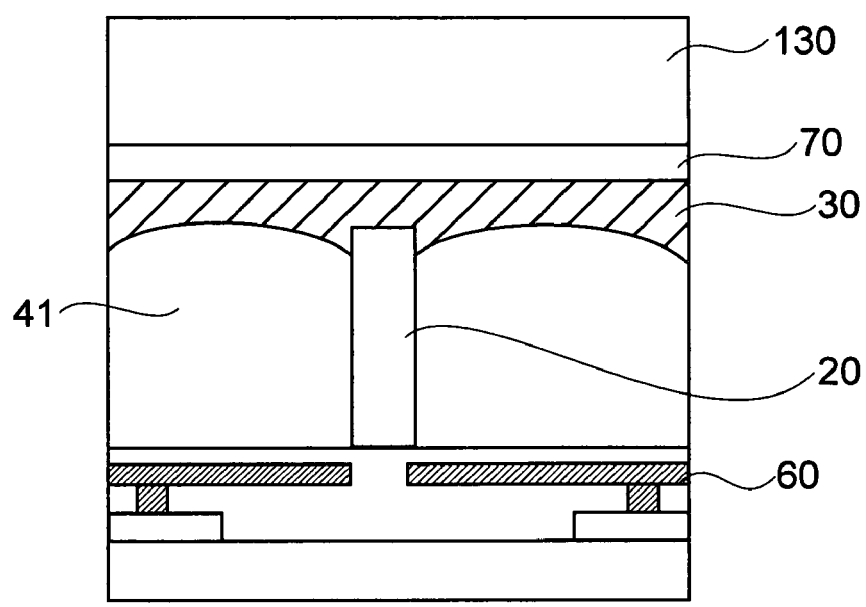

Then, a nematic liquid crystal layer 41 is deposited on the polyimide resin 15 (FIG. 32). The thickness of the liquid crystal 41 is approximately equal to the height of the spacers 20.

On the other hand, a PET substrate 130 covered by a transparent electrode 70 is prepared as a supporting member. The transparent electrode 70 is to constitute a second electrode.

A layer 120 of sealing film precursor is formed on the transparent electrode 71. As the sealing film precursor 130, 1,4-butanediol diglycidyl ether diacrylate (trade name: "NK oligo EA-5520"; specific gravity: not less than 1; mfd. by Shin Nakamura Kagaku Kogyo K.K.) being a UV curable monomer was used. This acrylate monomer and the liquid crystal are not soluble in each other and the acrylate monomer has a specific gravity larger than that of the liquid crystal.

The sealing film precursor layer 120 is formed in a thickness of 7 μm by spin-coating the acrylate monomer mixed with 5 wt. % of a photopolymerization initiator ("Irgacure 184", available from Ciba-Geigy, Ltd.) on the above-prepared supporting member 130.

Thereafter, the supporting member 130 is placed on the spacers 20 and the liquid crystal surface so that the sealing film precursor layer 120 contacts the spacers 20 and the liquid crystal (FIG. 32).

After the lapse of several seconds from the contact, the sealing film precursor layer 120 pushes the liquid crystal away to contact the top of the spacers 20. The sealing film precursor layer 120 finally covers the upper end portion and a part of the side portion of the spacers 20 as well as the surface of the liquid crystal similarly to FIG. 8.

The resultant structure is subjected to UV irradiation for 5 minutes at an intensity of 0.3 mW/cm at room temperature to effect polymerization of the sealing film precursor. As a result, a cured sealing film 30 is formed (FIG. 33).

The liquid crystal 41 is aligned perpendicular to the substrate. This is confirmed by observing the light transmittance of the display device. No light is transmitted under cross Nicols. The surface energy of the liquid crystal is 43 dyne/cm, which is larger than the surface energies of the polyimide on the substrate and the sealing film.

Drive of the display device of this example is effected by applying an alternative electric field to the liquid crystal through the first and the second electrodes. As a result, light is transmitted through the device, which intensity increases as the voltage between the electrodes increases.

Even when the substrate film is deformed, the light transmittance is not affected. This means that the thickness of the liquid crystal layer is unchanged under the deformation. It is thus confirmed that the sealing film is bonded to the spacer without being peeled off.

What is claimed is:

1. A process for producing an electric display device comprising:
    a substrate, a spacer disposed on said substrate, and a sealing film adhered to an upper end portion of said spacer, and a fluid disposed between a substrate and said sealing film: said process comprising:
    (A) a step of disposing a sealing film precursor, comprising a polymerizable compound, supported by a supporting member on both an exposed surface of said fluid and the upper end portion of said spacer in a state that the fluid is filled between adjacent spacers, and
    (B) a step of polymerizing the polymerizable compound to form the sealing film.

2. The process according to claim 1, wherein a surface energy of the sealing film is smaller than a surface energy of the fluid.

3. The process according to claim 1, wherein the sealing film precursor is disposed on the upper end portion and a part of the side portion of the spacer.

4. The process according to claim 1, wherein the electric display is a electrophoretic display device and the fluid is a dispersion liquid.

5. The process according to claim 1, wherein the electric display is a liquid crystal display device and the fluid is a liquid crystal.

* * * * *

UNITED STATES PATENT AND TRADEMARK OFFICE
CERTIFICATE OF CORRECTION

PATENT NO. : 7,245,417 B2  Page 1 of 1
APPLICATION NO. : 11/114163
DATED : July 17, 2007
INVENTOR(S) : Toshihiko Takeda It is certified that error appears in the above-identified patent and that said Letters Patent is hereby corrected as shown below:

On the Title Page, under "(56) References Cited", please add the following citations:

(1) US Patent 6,833,943 B2, and (2) the "Notification of the First Office Action for Corresponding Chinese Application No. 200380101758.4, 6 pages (2006-12-15).

Signed and Sealed this

Twenty-ninth Day of December, 2009

David J. Kappos
*Director of the United States Patent and Trademark Office*